United States Patent
Zheng et al.

(10) Patent No.: US 11,644,840 B2
(45) Date of Patent: May 9, 2023

(54) METHOD FOR CONTROLLING A ROBOT AND ITS END-PORTIONS AND DEVICE THEREOF

(71) Applicant: UBTECH ROBOTICS CORP LTD, Shenzhen (CN)

(72) Inventors: Dake Zheng, Shenzhen (CN); Yizhang Liu, Shenzhen (CN); Zheng Xie, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 258 days.

(21) Appl. No.: 17/109,099

(22) Filed: Dec. 1, 2020

(65) Prior Publication Data

US 2021/0200224 A1 Jul. 1, 2021

(30) Foreign Application Priority Data

Dec. 31, 2019 (CN) .......................... 201911418472.8

(51) Int. Cl.
  *B25J 9/16* (2006.01)
  *G05D 1/02* (2020.01)
  *B25J 13/08* (2006.01)
  *B62D 57/032* (2006.01)
  *B25J 11/00* (2006.01)

(52) U.S. Cl.
  CPC .......... *G05D 1/0212* (2013.01); *B25J 9/1641* (2013.01); *B25J 9/1653* (2013.01); *B25J 13/088* (2013.01); *B62D 57/032* (2013.01); *B25J 11/008* (2013.01)

(58) Field of Classification Search
  CPC ..... G05D 1/0212; B25J 9/1641; B25J 9/1653; B25J 13/088; B25J 11/008; B25J 9/1628; B25J 9/161; B25J 9/1664; B25J 13/00; B25J 13/08; B62D 57/032; G05B 2219/40264
  See application file for complete search history.

(56) References Cited

U.S. PATENT DOCUMENTS

| | | | |
|---|---|---|---|
| 2007/0150105 A1* | 6/2007 | Orita | B62D 57/032 700/245 |
| 2012/0316682 A1* | 12/2012 | Seo | B62D 57/032 901/1 |
| 2017/0010620 A1* | 1/2017 | Watabe | B25J 19/023 |
| 2018/0281881 A1* | 10/2018 | Komuro | G06T 7/73 |

FOREIGN PATENT DOCUMENTS

CN  1985773 A  6/2007

* cited by examiner

*Primary Examiner* — Abby Y Lin
*Assistant Examiner* — Dylan M Katz

(57) ABSTRACT

The present disclosure provides a method for controlling end-portions of a robot. The method includes obtaining joint information of a robot by at least one sensor and determining a first posture of an end-portion of the robot in accordance with the joint information, obtaining end-portion information of the robot by the sensor and obtaining the second posture of the end-portion of the robot including the interference information in accordance with the end-portion information of the robot and the first posture of the end-portion of the robot, and conducting a closed-loop control on the robot in accordance with an error between the second posture of the end-portion of the robot and a predetermined expected posture of the end-portion of the robot.

18 Claims, 5 Drawing Sheets

METHOD FOR CONTROLLING A ROBOT AND ITS END-PORTIONS AND DEVICE THEREOF

CROSS REFERENCE TO RELATED APPLICATIONS

The present disclosure claims priority to Chinese Patent Application No. CN201911418472.8, filed Dec. 31, 2019, which is hereby incorporated by reference herein as if set forth in its entirety.

BACKGROUND

1. Technical Field

The present disclosure relates to robotic field, and particularly to a method for controlling a robot and its end-portions and a device thereof.

2. Description of Related Art

With the evolution of robot technologies and the requirements of robots, the application of humanoid robots continues to increase, and at the same time, the application scenarios of humanoid robots become more complex.

For example, in an actual application scenario, a humanoid robot may need to pour a cup of hot tea and deliver the hot tea to the user. In order to reliably complete the above actions, it is necessary to ensure that the humanoid robot maintains the stability of the tea cup held in the palm of the end-portion of the arm while walking, thereby the tea may not spill out.

However, when the humanoid robot is walking, the changes in the position of the supporting feet may cause great impact, vibration and structural deformation of the arm of the robot, and these interferences may seriously affect the control of the end-portion of the arm. There are many other similar scenarios in industry and real life. Therefore, how to effectively control the movements of the arms of the robot become an urgent problem to be solved.

BRIEF DESCRIPTION OF THE DRAWINGS

To describe the technical schemes in the embodiments of the present disclosure or in the prior art more clearly, the following briefly introduces the drawings required for the descriptions in the present disclosure. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions of the present disclosure will be further described below with reference to the drawings and the embodiments. Apparently, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
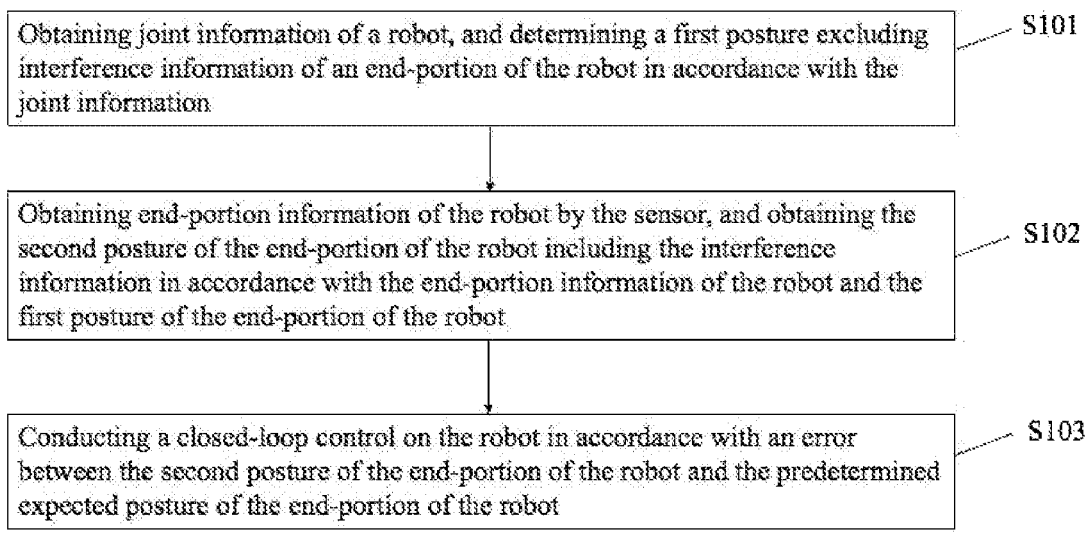
FIG. 1 is a flowchart of a method for controlling end-portions of a robot in accordance with one embodiment of a present disclosure.

FIG. 1 is a flowchart of a method for controlling an end-portion of a robot in accordance with one embodiment of a present disclosure.

Step S101: obtaining joint information of a robot, and determining a first posture excluding interference information of an end-portion of the robot in accordance with the joint information.

Specifically, the joint information of the robot may be detect by motion sensors, such as gyroscopes, configured at each movable joint of the robot. For example, a shown in FIG. 2, the sensor may be configured at each joint of the legs and each joint of the arms. By the sensors configured at the joints, the changes of the joint position may be effectively detected. The joint information includes an acceleration parameter, a speed parameter, an orientation parameter, etc. of the joints.

In an ideal state, the robot does not receive any shock or vibration, and the parts of the robot have not deformed. The first posture of the end-portion of the robot in the ideal state may be determined by combining the joint information detected by the sensors configured on the robot with the robot structure and the robot kinematic model (such as DH model, etc.). The first posture of the end-portion of the robot may include information such as the spatial position and orientation of the end-portion of the robot.

In order to accurately determine the first posture of the end-portion of the robot, the torso of the robot may be used as a reference. However, this is only one of the embodiments of the present disclosure and is not limited thereto.

Figure 3:
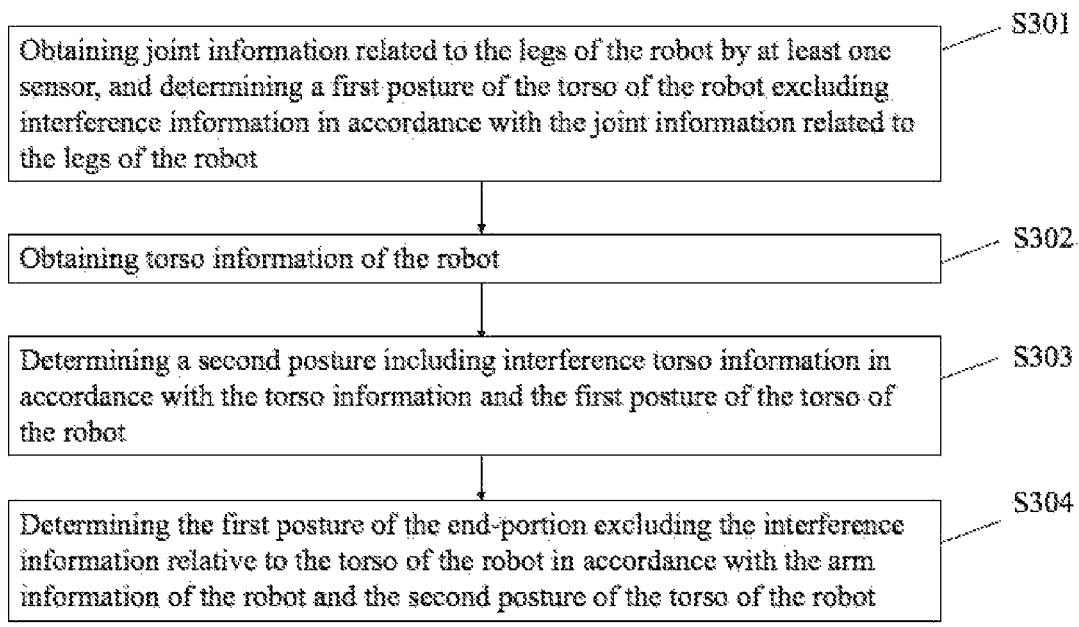
FIG. 3 is a flowchart of a method for determining a first posture of an end-portion of a robot in accordance with one embodiment of a present disclosure.

As shown in FIG. 3, the step of determining a first posture of an end-portion of the robot may include the following steps.

Step S301: obtaining joint information relating to the legs of the robot by at least one sensor, and determining a first posture of the torso of the robot excluding interference information in accordance with the joint information relating to the legs of the robot.

The joint information relating to the legs of the robot may be detected via the sensors configured at the joints of two legs of the robot, and the changes of the position and the direction of the leg joints of the robot may be determined. The interference, such as vibration and shock, of the joint information of the legs may be filtered. The ideal posture, i.e., the first posture of the torso of the robot, of the torso of the robot may be determined by combining the joint information relating to the legs of the robot with the structure of two legs of the robot and the robot kinematic model.

Step S302: obtaining torso information of the robot.

Figure 2:
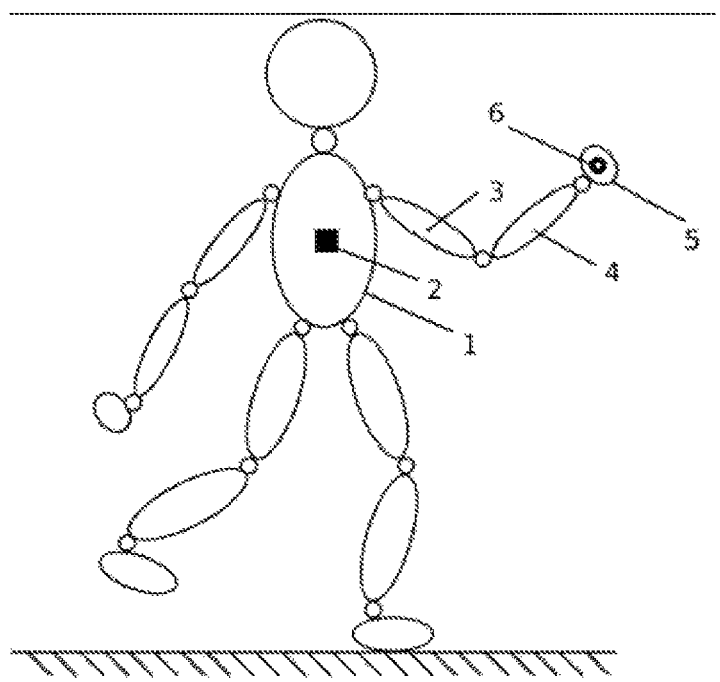
FIG. 2 is a schematic view of a robot in accordance with one embodiment of a present disclosure.

As shown in FIG. 2, a motion sensor is configured on the torso of the robot 1. The motion sensor may be a device, such as, a torso gyroscope 2, and the motion sensor may detect the changes of the torso information. The information may include status information, such as a vibration parameter, a deformation parameter and a shock parameter, of the torso of the robot.

Step S303: determining a second posture including interference torso information in accordance with the torso information and the first posture of the torso of the robot.

As shown in FIG. 2, the sensors may be configured at the joints of the robot, such as the elbow joint which connects the arm 3 and the forearm 4 of the robot and the wrist joint which connects the palm 5 and the forearm 4 to exclude the interference information of the robot. The second posture of the torso of the robot including the interference information may be determined by combining the first posture torso information in the ideal state when the torso of the robot is not interfered with the torso information in the actual state which is detected when the torso of the robot is interfered.

When the first posture of the torso of the robot is combined with the torso information, the interference information composition in the torso information may be extracted. The extracted interference information composition may be merged into the first posture of the torso of the robot to obtain the second posture of the torso of the robot. Since the sensors arranged at the torso of the robot are able to accurately detect the interference information such as the vibration parameter, the shock parameter and the deformation parameter of the robot, the second posture of the robot may be determined more accurately.

Step S304: determining the first posture of the end-portion excluding the interference information relative to the torso of the robot in accordance with the arm information of the robot and the second posture of the torso of the robot.

After the accurate second posture of the torso of the robot is determined, the second posture of the torso of the robot may be used as a reference to calculate and control the position of the end-portion of the robot.

The motion information of the arm of the robot may be detected via the sensors configured at the joints of the arm of the robot. For example, as shown in FIG. 2, the motion sensors are configured at the shoulders and the elbow joints of the robot, and the position changes and the direction changes of the arm of the robot may be detected via the motion sensors. An estimated posture of the end-portion of the robot may be calculated according to the change information of the position of the arm of the robot, the robot structure and the robot kinematics model. The first posture of the end-portion of the robot relative to the torso of the robot may be determined according to the estimated posture of the end-portion of the robot and the second posture of the torso of the robot.

In one embodiment of the present disclosure, the posture of the end-portion of the robot relative to any other position may be determined, and it may be adjusted and controlled through the corresponding expected posture.

In order to more reliably control the stability of the end-portion of the robot, in one embodiment of the present disclosure, the gait of the robot may also be controlled according to a predetermined expected posture of the torso of the robot. For example, the second posture of the torso of the robot including interference information is compared with the predetermined expected posture of the torso of the robot to determine the posture error, that is, the posture error of the torso of the robot. According to the obtained posture error of the torso of the robot, a closed-loop control is conducted on the robot gait. For example, when the second posture of the torso of the robot deviates from the predetermined expected posture of the torso of the robot, the robot gait may be adjusted, such that the second posture of the torso of the robot may be consistent with the predetermined expected posture of the torso of the robot.

When the second posture of the torso of the robot is effectively matched with the predetermined expected posture of the torso of the robot, the torso of the robot may be more balanced, which facilitates the stable control the posture of the end-portion of the robot.

Step S102: obtaining end-portion information of the robot by the sensor, and obtaining the second posture of the end-portion of the robot including the interference information in accordance with the end-portion information of the robot and the first posture of the end-portion of the robot.

As shown in FIG. 2, In one embodiment of the present disclosure, a sensor 6 is configured at the end-portion of the robot, such as the palm. The end-portion of the robot may be consider to be the position of the palm of the robot. The sensor configured on the end-portion of the robot may be the same as the sensor configured on the torso of the robot. For example, the sensor configured at the end-portion of the robot may be a gyroscope, which is used to detect the information, such as the speed, acceleration and orientation, of the end-portion of the robot.

Through the sensors configured at the end-portion of the robot, the posture information including interference information may be detected. The interference information may include the vibration parameter, the shock parameter and the deformation parameter of the end-portion of the robot. The second posture of the end-portion of the robot relative to the torso of the robot including the interference information may be determined by combining the posture information with the first pose of the end-portion of the robot estimated by the sensors configured on the arms of the robot.

In one embodiment of the present disclosure, the second posture of the end-portion of the robot may be relative to the torso of the robot or relative to any other position. By selecting the torso of the robot as a reference, it is convenient to divide the stable control of the robot into two-leg gait control and two-arm control, so that the stable control of the robot may be achieved more accurately.

For example, when the second posture of the end-portion of the robot is relative to the torso of the robot, the arm information of the robot may be obtained, and the first posture of the end-portion of the robot including the interference information relative to the torso of the robot may be calculated according to the arm information. The second posture of the end-portion of the robot relative to the torso of the robot may be determined according to the first posture of the end-portion of the robot relative to the torso of the robot and the end-portion information of the robot.

Step S103: conducting a closed-loop control on the robot in accordance with an error between the second posture of the end-portion of the robot and the predetermined expected posture of the end-portion of the robot.

When the second posture of the end-portion of the robot is determined to be the posture of end-portion of the robot relative to the torso of the robot, the expected posture of the end-portion of the robot relative to the torso of the robot may be determined correspondingly according to the predetermined expected posture of the torso of the robot.

After the expected posture of the end-portion of the robot relative to the torso of the robot is determined, the second posture of the end-portion of the robot relative to the torso of the robot is compared with the expected posture of the end-portion of the robot relative to the torso of the robot to determine the posture change. The arm joints of the robot are controlled in accordance with the expected posture of the end-portion of the robot relative to the torso of the robot, such that the end-portion of the robot may be maintained in a stable state. Therefore, the stable control of the robot end may be decomposed into the stable control of the torso of the robot and the stable control of the robot end-portion relative to the torso of the robot, which facilitate to simplify the stable control of the robot end-portion.

When the second posture of the end-portion of the robot is determined to be the end-portion of the robot relative to the ground or other positions, the second posture of the end-portion of the robot relative to the ground is compared with the expected posture of the end-portion of the robot relative to the ground. The closed-loop adjustments may be based on the posture errors to keep the robot in the stable state.

It can be understood that the size of the sequence number of each step in the foregoing embodiment does not mean the order of execution. The execution sequence of each process should be determined by its function and internal logic, and should not constitute any limitation on the implementation process of the embodiment of the present disclosure.

Figure 4:
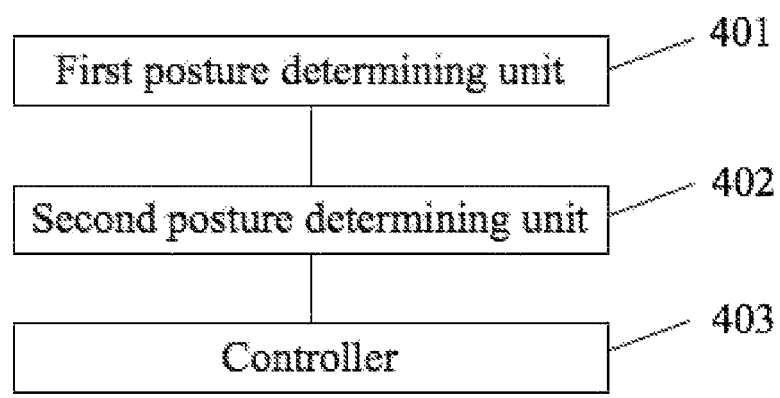
FIG. 4 is a schematic view of a device for controlling end-portions of a robot.

FIG. 4 is a schematic view of a device for controlling an end-portion of a robot. The detail is described below.

A device for controlling the end-portion of the robot may include a first posture determining unit 401, a second posture determining unit 402 and a controller 403.

The first posture determining unit 401 is configured to obtain the joint information of the robot and determine the first posture of the end-portion of the robot excluding the interference information in accordance with the join information.

The second posture determining unit 402 is configured to obtain the end-portion information of the robot and obtain the second posture of the end-portion of the robot including the interference information in accordance with the end-portion information of the robot and the first posture of the end-portion of the robot.

The controller 403 is configured to conduct a closed-loop control on the robot in accordance with the error between the second posture of the end-portion of the robot and the predetermined expected posture of the end-portion of the robot.

The device for controlling the portion of the robot shown in FIG. 4 corresponds to the method for controlling the robot shown in FIG. 1.

Figure 5:
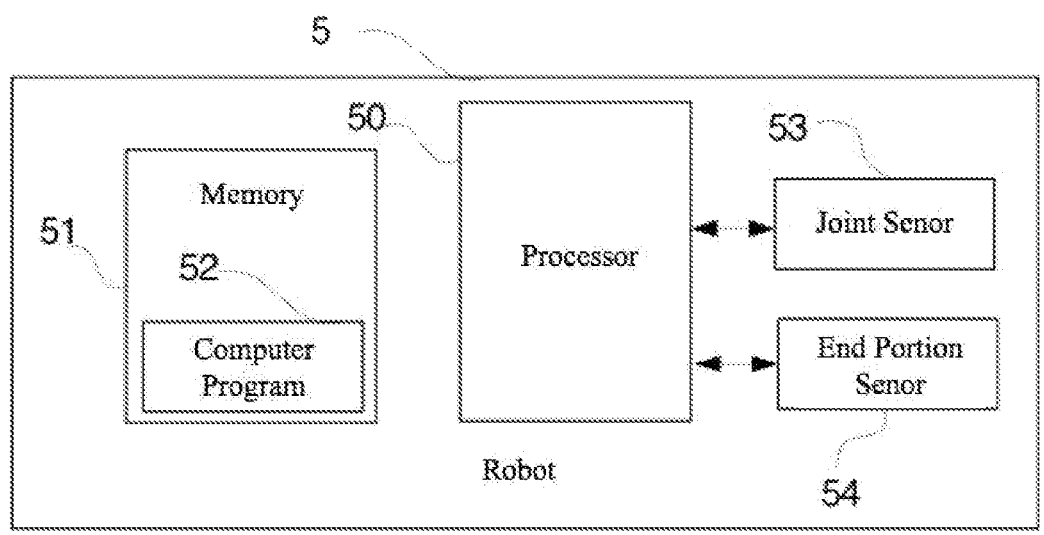
FIG. 5 is a schematic view of a robot in accordance with one embodiment of a present disclosure.

FIG. 5 is a schematic view of a robot in accordance with one embodiment of a present disclosure. As shown in FIG. 5, the robot 5 includes a processor 50, a memory 51, a joint sensor 53, an end-portion sensor 54 and a computer program 52 stored in the memory 51 and may be operated by the processor 50. In one example, the computer program 52 may be an end-portion control program of the robot. When the processor 50 executes the computer program 52, the steps in the above embodiments of the method for controlling the robot are realized. Alternatively, when the processor 50 executes the computer program 52, the functions of the modules/units in the above device embodiments are executed.

In one example, the computer program 52 may be divided into one or more modules/units, and the one or more modules/units are stored in the memory 51 and executed by the processor 50 to complete the present disclosure. The one or more modules/units may be a series of computer program instruction segments capable of completing specific functions, and the instruction segments are used to describe the execution process of the computer program 52 in the robot 5. For example, the computer program 52 can be divided into a first posture determining unit, a second posture determining unit and a controller.

The first posture determining unit is configured to obtain the joint information of the robot and determine the first posture of the end-portion of the robot excluding the interference information in accordance with the join information.

The second posture determining unit is configured to obtain the end-portion information of the robot and obtain the second posture of the end-portion of the robot including the interference information in accordance with the end-portion information of the robot and the first posture of the end-portion of the robot.

The controller is configured to conduct the closed-loop control on the robot in accordance with the error between the second posture of the end-portion of the robot and the predetermined expected posture of the end-portion of the robot.

The robot may include, but is not limited to, the processor 50, the memory 51, the joint sensor 53 and the end-portion sensor 54. Those persons skilled in the art can understand that FIG. 5 is merely an example of the robot 5, and does not constitute a limitation on the robot 5. It may include more or less components than what have been shown, or combine some parts, or different parts. For example, the robot may also include input devices, output devices, network access devices and buses, and so on.

Wherein, the joint sensor 53 is configured at the joint of the robot, including each joint of the robot hand, the robot leg, and the like. The end-portion sensor 54 is configured at the end-portion of the robot, for example, the end-portion of the robot hand. The joint sensor and the end-portion sensor may be a gyroscope, an acceleration sensor, or the like. The acquired motion state information includes joint information and end-portion information that may be motion speed, motion acceleration, etc.

The processor 50 may be a central processing unit (CPU), or may be other general purpose processors, digital signal processors (DSP), application specific integrated circuits (ASIC), field-programmable gate array (FPGA) or other programmable logic devices, discrete gates or transistor logic devices, discrete hardware components. The general purpose processor may be a microprocessor or any other conventional processors.

The memory 51 may be an internal storage unit of the robot 5, such as a hard disk or memory of the robot 5. The memory 51 may also be an external storage device of the robot 5, such as a plug-in hard disk, a smart memory card (SMC), a secure digital (SD) card on the robot 5, or flash card, etc. Further, the memory 51 may also include both the internal storage unit of the robot 5 and the external storage device. The memory 51 is used to store the computer program, other programs and data required by the robot. The memory 51 can also be used to temporarily store data that has been output or will be output.

Those skilled in the art can clearly understand that for the convenience and conciseness of description, only the division of the above functional units and modules is used as an example. In actual applications, the above functions can be allocated to different functional units, module completion means dividing the internal structure of the device into different functional units or modules to complete all or part of the functions described above. The functional units and modules in the embodiments can be integrated into one processing unit, or each unit can exist alone physically, or two or more units can be integrated into one unit. The above-mentioned integrated units can be hardware-based or can also be realized in the form of software functional units. In addition, the specific names of the functional units and modules are only for the convenience of distinguishing each other, and are not used to limit the protection scope of the present application. For the specific working process of the units and modules in the above system, please refer to the corresponding process in the foregoing method embodiment, which will not be repeated here.

In the foregoing embodiments, the description of each embodiment has its own focus. For parts that are not detailed or recorded in a certain embodiment, reference may be made to related descriptions of other embodiments.

A person of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraints of the technical solution. Professionals and technicians can use different methods to realize the described functions for each specific application, but this realization should not be considered beyond the scope of this application.

In the embodiments provided in this disclosure, it should be understood that the disclosed device/terminal device and method may be implemented in other ways. The device/terminal device embodiments described above are only illustrative. For example, the division of the modules or units is only a logical function division, and there may be other divisions in actual implementation, such as multiple units. Or components can be combined or integrated into another system, or some features can be omitted or not implemented. In addition, the displayed or discussed mutual coupling or direct coupling or communication connection may be indirect coupling or communication connection through some interfaces, devices or units, and may be electrical, mechanical or other forms.

The units described as separate components may or may not be physically separated, and the components displayed as units may or may not be physical units, that is, they may be located in one place, or they may be distributed on multiple network units. Some or all of the units can be selected according to actual needs to achieve the purpose of the solution of this embodiment.

In addition, the functional units in each embodiment of the present disclosure may be integrated into one processing unit, or each unit may exist alone physically, or two or more units may be integrated into one unit. The above-mentioned integrated unit can be realized in the form of hardware or software functional unit.

When the integrated module/unit is implemented in the form of a software functional unit and sold or used as an independent product, it can be stored in a computer readable storage medium. Based on this understanding, this application implements all or part of the processes in the above-mentioned embodiments and methods, and can also be completed by instructing relevant hardware through a computer program. The computer program can be stored in a computer-readable storage medium. When the program is executed by the processor, it can implement the steps of the foregoing method embodiments. The computer program includes computer program code, and the computer program code may be in the form of source code, object code, executable file, or some intermediate forms. The computer-readable medium may include: any entity or device capable of carrying the computer program code, recording medium, flash memory, mobile hard disk, magnetic disk, optical disk, computer memory, read-only memory (ROM), random access memory (RAM), electrical carrier signal, telecommunications signal, and software distribution media. It should be noted that the content contained in the computer-readable medium can be appropriately added or deleted according to the requirements of the legislation and patent practice in the jurisdiction. For example, in some jurisdictions, according to the legislation and patent practice, the computer-readable medium Does not include electrical carrier signals and telecommunication signals.

The above-mentioned embodiments are only used to illustrate the technical solutions of the present disclosure, not to limit thereto. Although the present disclosure has been described in detail with reference to the foregoing embodiments, those of ordinary skill in the art should understand that they can still modifiy the foregoing technical solutions, or replace some of the equivalently technical features. These modifications or replacements do not cause the essence of the corresponding technical solutions to deviate from the spirit and scope of the technical solutions of the embodiments of the disclosure, and should be included within the scope of protection of this application.

What is claimed is:

1. A method for controlling end-portions of a robot, comprising:
    obtaining joint information from a robot by at least one sensor configured at each movable joint of the robot, and determining a first posture of an end-portion of the robot in accordance with the joint information;
    obtaining end-portion information of the robot by a sensor configured at the end-portion of the robot;
    obtaining a second posture of the end-portion of the robot in accordance with the end-portion information of the robot and the first posture of the end-portion of the robot, wherein the second posture comprises interference information; and
    conducting a closed-loop control on the robot in accordance with an error between the second posture of the end-portion of the robot and a predetermined expected posture of the end-portion of the robot;
    wherein the step of obtaining the joint information from the robot by the at least one sensor, and determining the first posture of the end-portion of the robot in accordance with the joint information further comprises:
    obtaining joint information for legs of the robot by at least one sensor, and determining a first posture of a torso of the robot in accordance with the joint information for the legs of the robot;
    obtaining torso information by a sensor;
    determining a second posture of the torso in accordance with the torso information and the first posture of the torso of the robot, wherein the second posture comprises interference information;
    obtaining arm information of the robot by at least one sensor;
    determining the first posture of the end-portion relative to the torso of the robot in accordance with the arm information of the robot and the second posture of the torso of the robot.

2. The method of claim 1, wherein the step of determining a second posture further comprises:
    obtaining a posture error of the posture of the torso of the robot according to the second posture of the torso of the robot and the predetermined expected posture of the torso of the robot; and
    conducting the closed-loop control on a gait of the robot in accordance with the posture error of the torso of the robot.

3. The method of claim 1, wherein the method further comprises:
    obtaining the predetermined expected posture of the torso of the robot;

obtaining the predetermined expected posture of the end-portion of the robot relative to the torso of the robot in accordance with the predetermined expected posture of the torso of the robot.

4. The method of claim 1, wherein the step of obtaining end-portion information of the robot by the sensor, obtaining a second posture of the end-portion of the robot and determining a second posture in accordance with the torso information and the first posture of the torso of the robot further comprises:
obtaining joint information of arms of the robot and calculating the first posture of the end-portion of the robot according to the joint information of the arms, wherein the first posture of the end-portion of the robot is the posture of the end-portion of the robot relative to the torso of the robot; and
determining the second posture of the end-portion of the robot according to the first posture of the end-portion of the robot and the end-portion information of the robot, wherein the second posture of the end-portion of the robot is the posture of the end-portion of the robot relative to the torso of the robot, and the second posture comprises interference information.

5. The method of claim 4, wherein the end-portion information of the robot comprises an acceleration parameter and a speed parameter.

6. The method of claim 4, wherein the interference information comprises at least one of a vibration parameter, a shock parameter or a deformation parameter.

7. The method of claim 1, wherein the step of obtaining the joint information for the legs of the robot by at least one sensor, and determining the first posture of the torso of the robot in accordance with the joint information for the legs of the robot further comprises:
obtaining the joint information for the legs of the robot by sensors configured at joints of two legs of the robot, and filtering interference information in the joint information for the legs of the robot to obtain filtered joint information;
determining the first posture of the torso of the robot based on the filtered joint information, a structure of the two legs of the robot, and a robot kinematic model.

8. The method of claim 1, wherein the step of determining the second posture of the torso in accordance with the torso information and the first posture of the torso of the robot further comprises:
extracting interference information composition in the torso information, and merging the extracted interference information composition into the first posture of the torso of the robot to obtain the second posture of the torso of the robot.

9. The method of claim 3, wherein the second posture of the end-portion of the robot is the posture of the end-portion of the robot relative to the torso of the robot, and the method further comprises:
comparing the second posture of the end-portion of the robot with the predetermined expected posture of the end-portion of the robot relative to the torso of the robot, to determine a posture change; and
controlling arm joints of the robot in accordance with the predetermined expected posture of the end-portion of the robot relative to the torso of the robot.

10. A device for controlling end-portions of a robot, comprising:
a memory;
a processor; and
one or more computer programs stored in the memory and executable on the processor, wherein the one or more computer programs comprise:
instructions for obtaining joint information of a robot by at least one sensor configured at each movable joint of the robot, and determining a first posture of an end-portion of the robot in accordance with the joint information;
instructions for obtaining end-portion information of the robot by a sensor configured at the end-portion of the robot, and obtaining a second posture of the end-portion of the robot in accordance with the end-portion information of the robot and the first posture of the end-portion of the robot wherein the second posture comprises interference information;
instructions for conducting a closed-loop control on the robot in accordance with an error between the second posture of the end-portion of the robot and a predetermined expected posture of the end-portion of the robot;
wherein the instructions for obtaining the joint information of the robot and determining the first posture of the end-portion of the robot further comprise:
instructions for obtaining joint information for legs of the robot by at least one sensor, and determining a first posture of a torso of the robot in accordance with the joint information for the legs of the robot;
instructions for obtaining torso information;
instructions for determining a second posture of the torso in accordance with the torso information and the first posture of the torso of the robot;
instructions for obtaining arm information of the robot by at least one sensor;
instructions for determining the first posture of the end-portion relative to the torso of the robot in accordance with the arm information of a robot and the second posture of the torso of the robot.

11. The device of claim 8, wherein the instructions for determining a second posture further comprise:
instructions for obtaining a posture error of the torso of the robot according to the second posture of the torso of the robot and the predetermined expected posture of the torso of the robot;
instructions for conducting the closed-loop control on a gait of the robot in accordance with the error posture of the torso of the robot.

12. The device of claim 8, wherein the computer programs further comprise:
instructions for obtaining the predetermined expected posture of the torso of the robot;
instructions for obtaining the predetermined expected posture of the end-portion of the robot relative to the torso of the robot in accordance with the predetermined expected posture of the torso of the robot.

13. The device of claim 8, wherein the instructions for obtaining end-portion information of the robot by the sensor, obtaining a second posture of the end-portion of the robot and determining a second posture in accordance with the torso information and the first posture of the torso of the robot further comprise:
instructions for obtaining joint information of the arms of the robot and calculating the first posture of the end-portion of the robot according to the joint information of the arms of the robot, wherein the first posture of the end-portion of the robot is the posture of the end-portion of the robot relative to the torso of the robot;
instructions for determining the second posture of the end-portion of the robot according to the first posture of the end-portion of the robot and the end-portion information of the robot, wherein the second posture of the end-portion of the robot is the posture of the end-portion of the robot relative to the torso of the robot.

14. The device of claim 13, wherein the end-portion information of the robot comprises an acceleration parameter and an speed parameter.

15. The device of claim 13, wherein the interference information comprises at least one of a vibration, shock or deformation.

16. The device of claim 8, wherein the instructions for obtaining the joint information for the legs of the robot by at least one sensor, and determining the first posture of the torso of the robot in accordance with the joint information for the legs of the robot further comprise:
- instructions for obtaining the joint information for the legs of the robot by sensors configured at joints of two legs of the robot, and filtering interference information in the joint information for the legs of the robot to obtain filtered joint information;
- instructions for determining the first posture of the torso of the robot based on the filtered joint information, a structure of the two legs of the robot, and a robot kinematic model.

17. The device of claim 8, wherein the instructions for determining the second posture of the torso in accordance with the torso information and the first posture of the torso of the robot further comprise:
- instructions for extracting interference information composition in the torso information, and merging the extracted interference information composition into the first posture of the torso of the robot to obtain the second posture of the torso of the robot.

18. The device of claim 12, wherein the second posture of the end-portion of the robot is the posture of the end-portion of the robot relative to the torso of the robot, and the computer programs further comprise:
- instructions for comparing the second posture of the end-portion of the robot with the predetermined expected posture of the end-portion of the robot relative to the torso of the robot, to determine a posture change; and
- instructions for controlling arm joints of the robot in accordance with the predetermined expected posture of the end-portion of the robot relative to the torso of the robot.

* * * * *